(12) United States Patent
Nordberg et al.

(10) Patent No.: US 9,315,082 B2
(45) Date of Patent: Apr. 19, 2016

(54) FLOATING DEVICE FOR AMPHIBIOUS VEHICLE

(71) Applicant: BAE Systems Hägglunds Aktiebolag, Örnsköldsvik (SE)

(72) Inventors: Björn Nordberg, Örnsköldsvik (SE); Fredrik Burholm, Örnsköldsvik (SE)

(73) Assignee: BAE SYSTEMS HÄGGLUNDS AKTIEBOLAG, Örnsköldsvik (SE)

( * ) Notice: Subject to any disclaimer, the term of this patent is extended or adjusted under 35 U.S.C. 154(b) by 0 days.

(21) Appl. No.: 14/399,785

(22) PCT Filed: Jun. 25, 2013

(86) PCT No.: PCT/SE2013/050763
§ 371 (c)(1),
(2) Date: Nov. 7, 2014

(87) PCT Pub. No.: WO2014/003648
PCT Pub. Date: Jan. 3, 2014

(65) Prior Publication Data
US 2015/0111446 A1    Apr. 23, 2015

(30) Foreign Application Priority Data
Jun. 26, 2012 (SE) ....................... 1250695

(51) Int. Cl.
*B60F 3/00* (2006.01)
*F41H 7/00* (2006.01)

(52) U.S. Cl.
CPC ............... *B60F 3/0038* (2013.01); *B60F 3/003* (2013.01); *F41H 7/00* (2013.01)

(58) Field of Classification Search
CPC ...................................................... B60F 3/0038
USPC ........................................ 440/12.5; 180/14, 9
See application file for complete search history.

(56) References Cited

U.S. PATENT DOCUMENTS 1,631,248 A * 6/1927 Cook ...................... B60F 3/003
                                                          440/12.52
2,048,181 A    7/1936 Cook
(Continued)

FOREIGN PATENT DOCUMENTS

| GB | 288852 | 4/1928 |
|----|--------|--------|
| WO | 95/31347 A1 | 11/1995 |
| WO | 2006/000638 A1 | 1/2006 |

OTHER PUBLICATIONS

International Search Report and Written Opinion received for PCT Patent Application No. PCT/SE2013/050763, mailed on Sep. 12, 2013, 9 pages.

*Primary Examiner* — Lars A Olson
*Assistant Examiner* — Jovon Hayes
(74) *Attorney, Agent, or Firm* — Morrison & Foerster LLP

(57) ABSTRACT

The present invention relates to a floating device for an amphibious two-bodied vehicle with a front vehicle unit and a rear vehicle unit, which are mutually pivotable, wherein the floating device comprises a floating element configuration extending along essentially the entire length of the long sides of the vehicle and being arranged to provide additional displacement, wherein said floating element configuration is arranged for accommodating mutual pivoting of said vehicle units during floating as well as non-floating drive. The present invention also relates to an amphibious vehicle.

14 Claims, 5 Drawing Sheets

(56) References Cited

U.S. PATENT DOCUMENTS

| | | | | |
|---|---|---|---|---|
| 2,933,143 A * | 4/1960 | Robinson | B60D 1/322 | 180/14.1 |
| 3,426,720 A * | 2/1969 | Enos | B62D 53/021 | 180/244 |
| 4,072,203 A * | 2/1978 | Pierson | B60F 5/003 | 180/9.44 |
| 4,645,023 A * | 2/1987 | Rea | B62D 55/0655 | 180/9.32 |
| 4,934,300 A * | 6/1990 | Seligman | B62D 55/0655 | 440/12.56 |
| 5,113,958 A * | 5/1992 | Holden | B62D 11/20 | 180/9.1 |
| 5,984,032 A * | 11/1999 | Gremillion | B62D 55/0655 | 180/14.1 |
| 8,348,708 B2 * | 1/2013 | Kanerva | B60F 3/0015 | 114/77 R |
| 8,454,399 B1 * | 6/2013 | Zelechonok | B60F 3/0069 | 440/12.51 |
| 2009/0242697 A1 * | 10/2009 | Schmidt | F41H 7/02 | 244/106 |
| 2015/0111446 A1 * | 4/2015 | Nordberg | F41H 7/00 | 440/12.5 |

* cited by examiner

FLOATING DEVICE FOR AMPHIBIOUS VEHICLE

CROSS-REFERENCE TO RELATED APPLICATIONS

This application is a U.S. National Phase patent application of PCT/SE2013/050763, filed on Jun. 25, 2013, which claims priority to Swedish Patent Application No. 1250695-2, filed on Jun. 26, 2012, the entire contents of which are incorporated herein by reference.

FIELD OF THE INVENTION

The invention relates to a floating device for amphibious vehicle according to the preamble of claim 1. The invention also relates to an amphibious vehicle.

BACKGROUND OF THE INVENTION

Articulated tracked vehicles are in certain cases amphibious and can swim. Characteristics for swimming with articulated vehicles of today is that they swim with own displacement. They thus run deep in the water and the speed in water becomes low due to the vehicle being short. In addition propulsion with the tracks as drive source has poor efficiency.

The possibilities of swimming in dead calm and flat water are limited. Such tracked vehicles are approved for swimming in so called Sea-state 1 and in some case so called Sea-state 2.

The possibilities for such vehicles to swim longer distances are limited to fuel carried, poor efficiency and low speed.

In order to facilitate swimming and/or increasing the stability of such vehicles in water during swimming it is known to add displacement in the form of fixed or inflatable volumes.

U.S. Pat. No. 2,048,181 shows a two-bodied vehicle in the shape of a wheel driven towing vehicle with trailer on wheels having floating pontoons along the entire length of the equipage.

U.S. Pat. No. 1,631,248 shows a toe-bodied vehicle in the shape of a wheel driven towing vehicle with a turnable trailer. In the swimming position the trailer is turned and mounted fixedly to the towing car in order to extend the entire length of the equipage.

An object of the present invention is to provide a floating device for an amphibious two-bodied vehicle which facilitates improved drive.

SUMMARY OF THE INVENTION

These and other objects, apparent from the following description, are achieved by means of a floating device for amphibious vehicle and an amphibious vehicle, which are of the type stated by way of introduction and which in addition exhibits the features recited in the characterising clause of the appended claim 1. Preferred embodiments of the floating device and the vehicle are defined in appended dependent claims 2-12 and 14.

Specifically an object of the invention is achieved by the objects are achieved with a floating device for an amphibious two-bodied vehicle with a front vehicle unit and a rear vehicle unit, which are mutually pivotable, wherein the floating device comprises a floating element configuration extending along essentially the entire length of the long sides of the vehicle and being arranged to provide additional displacement, wherein said floating element configuration is arranged for accommodating mutual pivoting of said vehicle units during floating as well as non-floating drive. Hereby improved drive in water is facilitated at the same time as mutual pivoting of said vehicle units with said floating element configuration is facilitated for steering in water e.g. during drive by means of drive tracks of a tracked vehicle and on land.

According to an embodiment of the floating device said floating element configuration comprises a floating element arrangement in connection to the respective long side of the vehicle. Hereby drive in water is improved.

According to an embodiment of the floating device a floating element arrangement is provided comprising a front and a rear floating element portion mutually pivotably connected to each other in connection to a linked waist portion between the vehicle units. Hereby an efficient way of facilitating mutual pivoting of the vehicle units with said floating arrangements arranged in connection to the vehicle at the same time as good drive in the water is obtained.

According to an embodiment of the floating device a bellows configuration is provided between said front and rear floating element portions. Hereby efficient pivoting of the floating element for pivoting with said vehicle units is facilitated.

According to an embodiment of the floating device a link configuration is provided between said front and rear floating element portions. Hereby efficient pivoting of the floating element for pivoting with said vehicle units is facilitated.

According to an embodiment of the floating device said front and rear floating element portions are inflatable and mutually pivotable. Hereby efficient pivoting of the floating element for pivoting with said vehicle units and possibility of stowing away during evacuation of the respective floating element portions is facilitated.

According to an embodiment of the floating device one of said front and rear floating elements is fixedly arranged to the vehicle and the other is displacably arranged to the vehicle in its longitudinal direction. Hereby efficient pivoting of the floating element for pivoting with said vehicle units is facilitated.

According to an embodiment of the floating device said floating element arrangement comprises a rigid floating element linkedly arranged to the vehicle. Hereby pivoting of said vehicle units is facilitated with a rigid floating element arranged along essentially the entire long side of the vehicle, a rigid floating element resulting in optimized drive in water.

According to an embodiment of the floating device said rigid floating element is inwardly and outwardly pivotably linked to said rear vehicle unit. Hereby drive in water is improved during mutual pivoting of said vehicle units.

According to an embodiment of the floating device said floating element configuration comprises means for propulsion. Hereby efficient drive in water is facilitated.

According to an embodiment of the floating device said floating element configuration comprises propellant for said propulsion. Hereby utilization of drive means of the floating element configuration during drive in water is facilitated such the drive means of the vehicle is not consumed during drive in water but rather can be fully utilized during drive on land.

According to an embodiment of the floating device said floating element configuration comprises a portion arranged as a bow. By using a portion arranged as a bow of a boat improved drive in water is facilitated.

BRIEF DESCRIPTION OF THE DRAWINGS

A better understanding of the present invention will be had upon the reference to the following detailed description when read in conjunction with the accompanying drawings, wherein like reference characters refer to like parts throughout the several views, and in which.

DETAILED DESCRIPTION OF THE INVENTION

Figure 1:
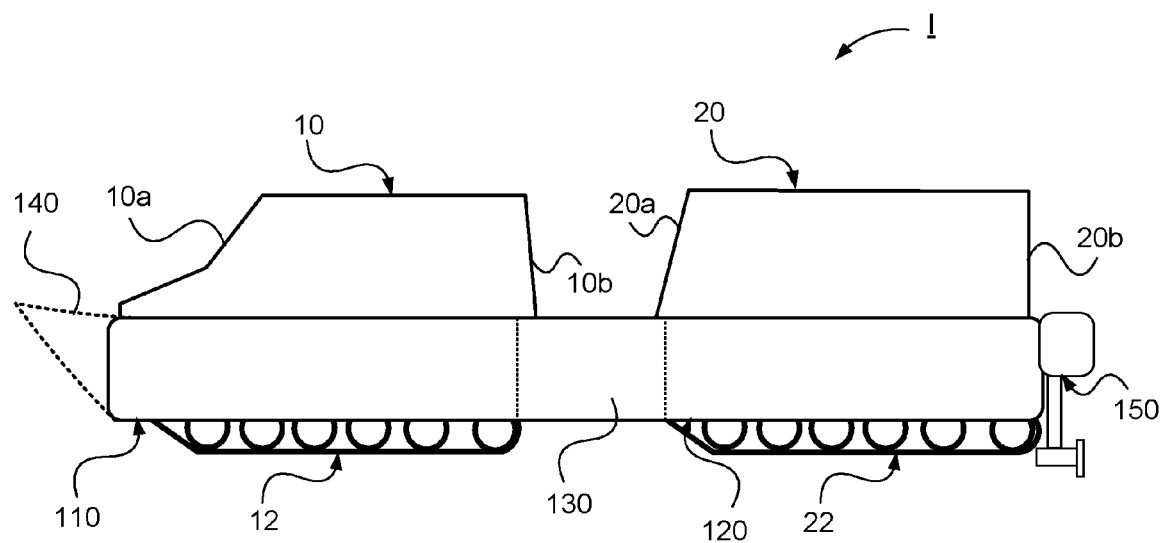
FIG. 1 schematically illustrates a side view of an amphibious two-bodied vehicle according to an embodiment of the present invention.

FIG. 1-10 schematically illustrate an amphibious two-bodied vehicle which is constituted by an articulated vehicle I; II; III; IV; V; VI; VII; VIII; IX; X with a floating device 100, 140; 200; 300; 400; 500, 560, 570; 600, 660, 670; 700; 760, 770; 800; 860, 870; 900, 940; 1000, 1080 according to different embodiments of the present invention.

The articulated vehicle I-X according to the embodiments below comprise a front vehicle unit 10 and a rear vehicle unit 20 steerably interconnected by means of a steering device 5.

Said front vehicle unit 10 and rear vehicle unit 20 are mutually pivotable. The front vehicle unit 10 has front ground engaging members 12 in the form a front tracks 12. The rear vehicle unit 20 has rear ground engaging member 22 in the form of rear tracks 22. Said front and rear ground engaging members 12 of the front vehicle unit 10 and/or said rear ground engaging members 22 of the rear vehicle unit 20 are constituted by driving ground engaging members, here driving tracks.

Said driving is arranged to be effected in any suitable way by means of any suitable driveline connected to said driving ground engaging members 12, 22, said driveline according to an embodiment comprising one or more combustion engines and/or one or more electric motors.

Said front vehicle unit 10 has a front side 10a, an opposite rear side 10b and opposite long sides 10c, 10d. Said rear vehicle unit 20 has a front side 20a, an opposite rear side 20b and opposite long sides 20c, 20d.

The floating device 100, 140; 200; 300; 400; 500, 560, 570; 600, 660, 670; 700; 760, 770; 800; 860, 870; 900, 940; 1000, 1080 according to the present invention comprises a floating element configuration 100, 140; 200; 300; 400; 500, 560, 570; 600, 660, 670; 700; 760, 770; 800; 860, 870; 900, 940; 1000, 1080 extending along essentially the entire length of the vehicle along the long sides of the vehicle 10c, 10d, 20c, 20d and arranged to provide additional displacement.

Said floating element configuration is arranged to accommodate mutual pivoting of said vehicle units 10, 20 during floating as well as non-floating drive. Said floating element configuration is according to the embodiments illustrated in FIG. 1-0 consequently arranged to accommodate mutual pivoting of said front and rear vehicle units 10, 20 during drive in water as well as on land.

Said floating element configuration comprises a floating arrangement 100; 200; 300; 400; 500; 600; 700; 800; 900; 1000 in connection to the respective long side 10c, 10d, 20c, 20d of the vehicle. Said floating arrangements are arranged to run in connection to the respective long sides 10c, 10d, 20c, 20d along essentially the entire length comprising running a bit longer than the length of the vehicle and running a bit shorter than the length of the vehicle. Each floating arrangement is consequently arranged to run along both the front and the rear vehicle units 10, 20 respective long sides 10c, 10d, 20c, 20d of the vehicle. Hereby a function of a longer boat-like vehicle is obtained during drive in water, the speed in water being increased, in accordance with the physical formula for displacement boats with the thumb rule $v=2.43\sqrt{L}$, where v is the speed in knots and L is the length of the water line in meters. A thumb rule is that a displacement boat runs approximately as fast in knots as the length of the water line in meters.

Said floating element arrangement is according to an embodiment fixedly mounted on the vehicle. Said floating according to an embodiment removably mounted on the vehicle. According to a variant means are provided for loosening said floating arrangement from within the vehicle in order to thus quickly being able to drive without said floating arrangement during landing.

Said floating arrangement 100; 200; 300; 400; 500; 600; 700; 800; 900; 1000 comprises displacement increasing means for provision of said additional displacement. Said floating arrangement 100; 200; 300; 400; 500; 600; 700; 800; 900; 1000 may be constituted by or comprise any suitable material for improved buoyancy such as e.g. cellular plastic, Styrofoam, PVC or the like.

Said floating arrangement comprises according to an embodiment at least one rigid floating element. Said floating element is according to a variant constituted by floating blocks in the form of floating pontoons. Said rigid floating elements comprise according to an embodiment a tank configuration with an outer rigid layer, said tank configuration being filled with a displacement increasing means such as e.g. polyurethane foam. Said outer layer of the tank configuration is according to an embodiment constituted by an armoured material.

Said floating arrangement comprises according to an embodiment at least one inflatable element.

Said floating element configuration comprises means 150; 950 for driving in water. Said means for propulsion comprises according to an embodiment a motor in the shape of an outboard motor or the corresponding arrange in the rear portion of said floating element configuration, said motor according to a variant being constituted by an electric motor for propeller drive, according to a variant by a combustion engine for propeller drive, according to a variant a water jet motor for water jet drive or combinations of the same.

Alternatively or as a complement said vehicle comprises means for propulsion in water. Said means for propulsion comprises according to an embodiment a motor in the shape of an outboard motor or the corresponding arranged in the rear end of the rear vehicle unit 20 of said two-bodied vehicle, said motor according to a variant being constituted by an electric motor for propeller drive, according to a variant a water jet motor for water jet drive or combinations of the same.

Said floating element configuration comprises according to a variant propellant for driving of said means for propulsion. Said propellant comprises any suitable propellant for driving comprising electric propellant, fuel propellant, propellant for water jet motor or the corresponding. Due to the fact that the floating element configuration comprises propellant the propellant of the vehicle does not need to be utilized during drive in water such that the vehicle during disembarking may utilize its propellant to full extent. According to a variant the propellant of the vehicle is utilized for driving of said means for propulsion.

Said floating element arrangements 100; 200; 300; 400; 500; 600; 700; 800; 900; 1000 are configured to provide a widening of the two-bodied vehicle for increased stability for facilitating drive in water for facilitating drive in so called Sea State 3 or higher.

Driving of the articulated tracked vehicle may be effected by means of said propellant, and/or by means of the driven tracks of the tracked vehicle, means of said floating element configuration for accommodating mutual pivoting of said vehicle units 10, 20 even during drive in water facilitates steering in water during drive by means of said driving tracks 12, 22 of the articulated tracked vehicle. In the case that said propellant of the floating element configuration and/or the articulated tracked vehicle would break down the vehicle may consequently be driven and turned in water by means of said driven tracks.

FIGS. 1-6 and 9 schematically illustrate amphibious two-bodied vehicles I-XI and IX according to embodiments of the present invention said floating arrangement 100; 200; 300; 400; 500; 600; 900 comprises a front and a rear floating element portion 110, 120; 210, 220; 310, 320; 410, 420; 510, 520; 610, 620; 910, 920 mutually pivotably connected to each other in connection to a linked waist portion 130; 230; 330; 430; 530; 630; 930 between the vehicle units 10, 20. Hereby said front and rear floating element portions 110, 120; 210, 220; 310, 320; 410, 420; 510, 520; 610, 620; 910, 920 are pivotable relative to each other at said waist portion. Said waist portion is arranged between said front and rear floating element portions in an area in connection to and between said front and rear vehicles units 10, 20. Said waist portion is configured such that during mutual pivoting between said front and rear vehicle units 10, 20 the front floating element portion 110; 210; 310; 410; 510; 610; 910 pivots with the front vehicle unit 10 and the rear floating element portion 120; 220; 320; 420; 520; 620; 920 pivots with the rear vehicle unit 20.

FIG. 1 schematically illustrates a side view of an amphibious two-bodied vehicle I in the shape of an articulated vehicle I with a floating device 100, 150 according to an embodiment of the present invention.

The floating device comprises a floating element configuration 100, 150 extending along essentially the entire length of the long sides of the vehicle arranged to provide additional displacement, said floating element configuration being arranged to accommodate mutual pivoting of said vehicle units 10, 20 during floating as well as non-floating drive.

The floating element configuration 100, 150 comprises floating element arrangements 100 in connection to each long side 10*c*, 10*d*, 20*c*, 20*d* of the vehicle. According to a variant said floating element arrangements 100 comprise a rigid floating element 100. Said floating element 100 is according to a variant linkedly arranged at the vehicle. Said floating element 100 comprises according to a variant a front and a rear floating element portion 110, 120 mutually pivotably connected to each other in connection to a linked waist portion 130 between the vehicle units 10, 20, said linked waist portion 130 facilitating mutual pivoting thereby of said front and rear floating element portions 110, 120. Said floating element comprises according to this variant a boat body configuration 140 for improved drive in water.

Said floating element configuration 100, 150 comprises means for propulsion in the shape of a propeller driven motor 150 arranged in connection to said floating element arrangements.

Figure 2:
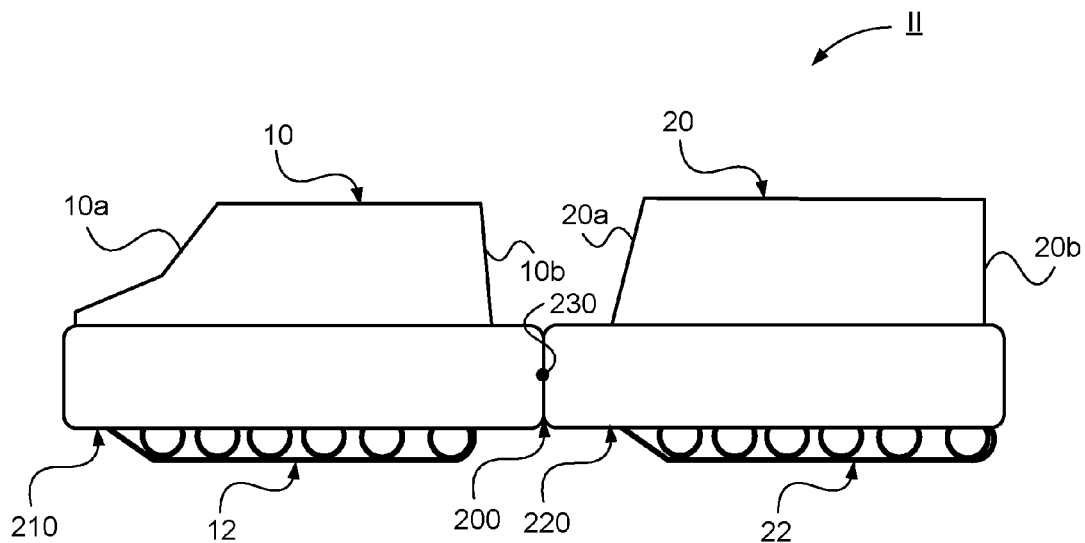
FIG. 2 schematically illustrates a side view of an amphibious two-bodied vehicle according to an embodiment of the present invention.

FIG. 2 schematically illustrates a side view of an amphibious two-bodied vehicle II in the shape of an articulated vehicle II with a floating device 200 according to an embodiment of the present invention.

The floating device 200 according to the embodiment illustrated in FIG. 2 differs from the floating device according to the embodiment in FIG. 1 essentially by the design of said floating element 200 of the floating element arrangement 200.

Said floating element 200 comprises according to this embodiment a front and a rear floating element portion 210, 220, said front and rear floating element portions 210, 220 being inflatable and mutually pivotable to each other in connection to a linked waist portion 230 between the vehicle units 10, 20. Said linked waist portion 230 may be constituted by a tapering of the floating element 200, said front and rear floating element portion 210, 220 being air-connected to each other. Said linked waist portion may be constituted by a link configuration 230 between the front and rear floating element portion 210, 220 constituting the two separate elements, said link configuration 230 according to a variant being constituted by said front and rear floating element portions 210, 220 bearing on each other and according to another variant by an actual connection between the front and rear floating element portion 210, 220.

Figure 3:
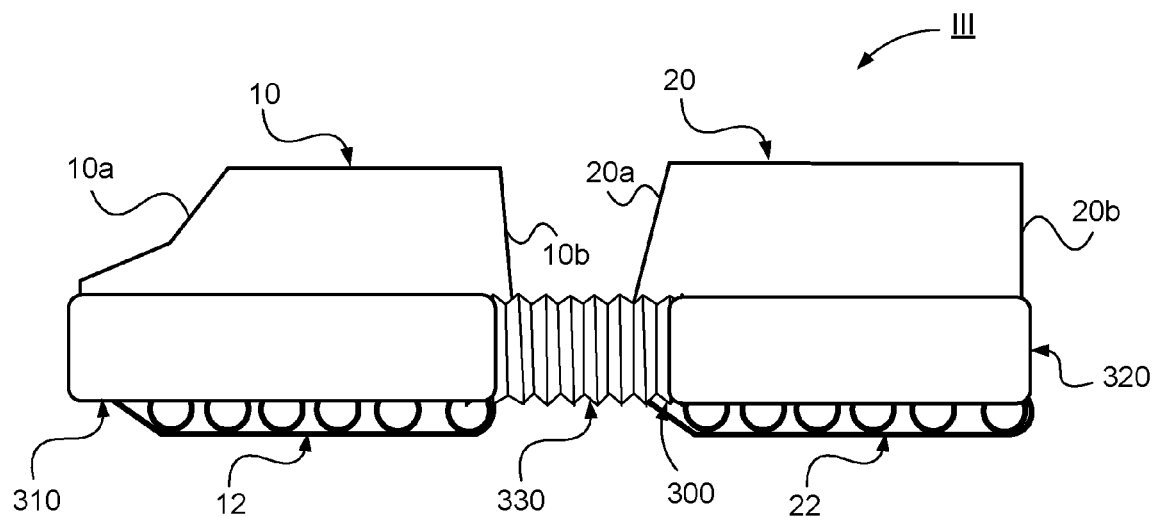
FIG. 3 schematically illustrates a side view of an amphibious two-bodied vehicle according to an embodiment of the present invention.

FIG. 3 schematically illustrates a side view of an amphibious two-bodied vehicle III in the shape of an articulated vehicle III with a floating device 300 according to an embodiment of the present invention.

The floating device 300 according to the embodiment illustrated in FIG. 3 differs from the floating device according to the embodiment in FIG. 1 essentially by the design of said floating element 300 of the floating element arrangement 300.

Said floating element 300 comprises according to this embodiment a front and rear floating element portion 310, 320, said front and rear floating element portion 310, 320 being mutually pivotably connected to each other in connection to a linked waist portion 330 between the vehicle units 10, 20. Said linked waist portion 330 is constituted by a bellows configuration between said front and rear floating element portion 310, 320. Said front and rear floating element portion 310, 320 may be rigid bodies or inflatable.

Figure 4:
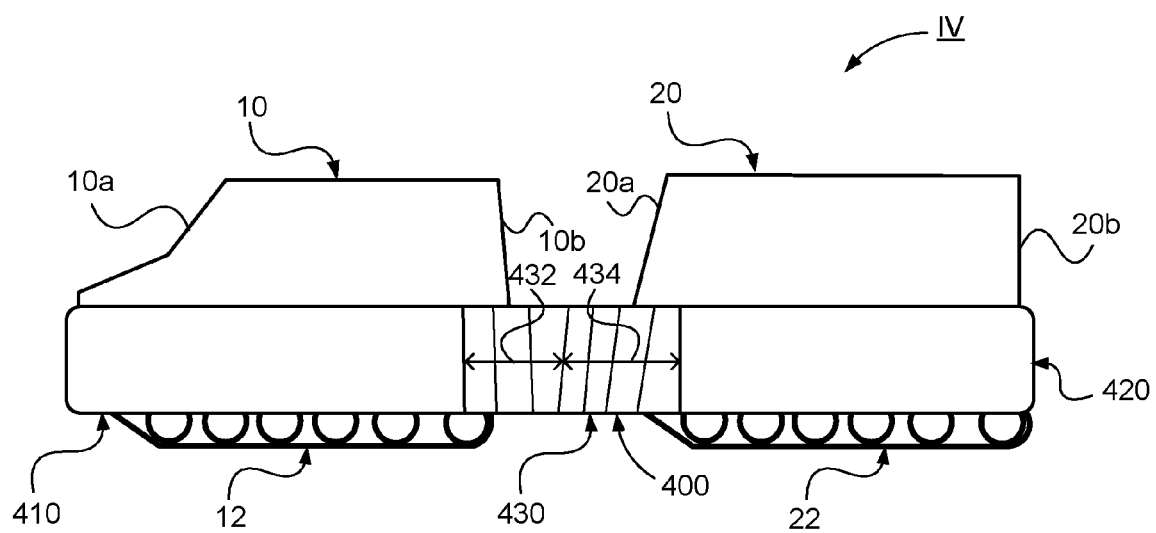
FIG. 4 schematically illustrates a side view of an amphibious two-bodied vehicle according to an embodiment of the present invention.

FIG. 4 schematically illustrates a side view of a two-bodied vehicle IV in the shape of an articulated vehicle with a floating device 400 according to an embodiment of the present invention.

The floating device illustrated in FIG. 4 differs from the embodiment in FIG. 1 essentially by the design of said floating element 400 of the floating element arrangement 400.

Said floating element 400 comprises according tot this embodiment a front and a rear floating element portion 410, 420, said front and rear floating element portions 410, 420 being inflatable and mutually pivotably connected to each other in connection to a linked waist portion 430 between the vehicle portions 10, 20. Said linked waist portion 430 is according to this variant constituted by filling member 430 developable between the front and rear floating element portions 410, 420.

The filling member 430 is according to an embodiment inflatable. The filling member 430 is according to an embodiment projectable, the filling member 430 according to a variant comprising a first filling member 432 arranged in connection to the front floating portion 410 and by activation configured to expand in direction towards the rear floating element portion 420, and a second filling portion 434 arranged in connection to the rear floating element portion 420 and configured by activation to expand in direction towards the front floating element portion 410 such that the first and second filling portion 432, 434 together fills out the space between the front and rear floating element portion 410, 420.

Said filling member 430 is consequently arrange to fill out the space between the front and rear floating element portion 410, 420 such that an essentially even floating element arrangement 400 is obtained along the respective side 10c, 10d, 20c, 20d of the vehicle in order to thus optimize drive in water.

Figure 5:
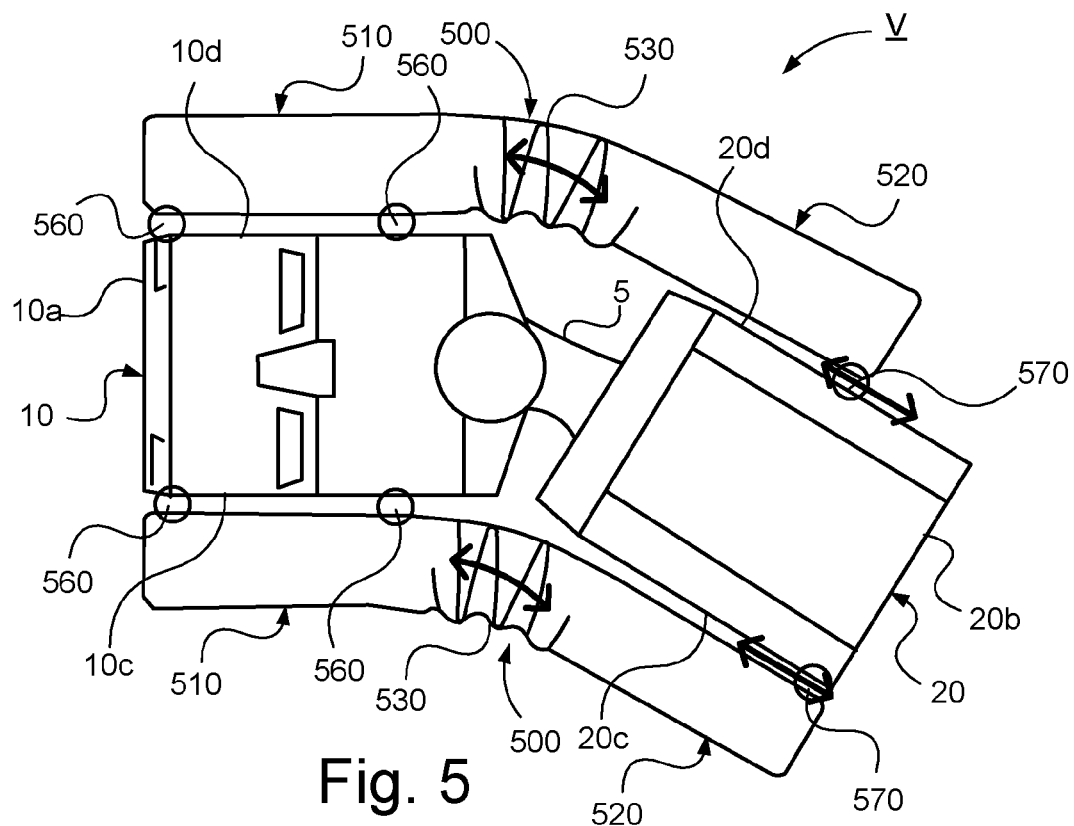
FIG. 5 schematically illustrates a plan view of an amphibious two-bodied vehicle according to an embodiment of the present invention.

FIG. 5 schematically illustrates a plan view of an amphibious two-bodied vehicle V in the shape of an articulated vehicle V with a floating device 500, 560, 570 according to an embodiment of the present invention.

The floating device according to the embodiment illustrated in FIG. 2 differs from the floating device according to the embodiment in FIG. 1 essentially by the shape of said floating element 500 of the floating element arrangement 500, 560, 570.

Said floating element 500 comprises according to this embodiment a front and rear floating element portion 510, 520, said front and rear floating element portion 510, 520 being mutually piovatably connected to each other in connection to a linked waist portion 530 between the vehicle units 10, 20. Said linked waist portion 530 is constituted by a flexible portion of the floating element arrangement 500, said front and rear floating element portion 510, 520 being connected to said flexible portion 530 and according to a variant constitutes a bellows configuration 530. Said first and second floating element portions 510, 520 constitute according to a variant rigid floating element portions 510, 520. Said first and second floating element portions 510, 520 constitute according to a variant inflatable floating element portions 510, 520.

The front floating element portion 510 of the respective floating element 500 is fixedly arranged to the front vehicle unit 10 and the rear floating element portion 520 is displaceably arranged in connection to the long side 20c, 20d of the rear vehicle unit 20 via a fastening member 570 arranged at the rear vehicle unit 20 movable along the long side 20c, 20d of the rear vehicle unit 20, the rear floating element portion 520 being fixedly arranged to the movable fastening member 570.

Hereby the rear floating element portion 520 is allowed to move relative to the vehicle and relative to the rear vehicle unit 20 in its longitudinal extension by mutual pivoting of the front and rear vehicle units 10, 20.

Figure 6:
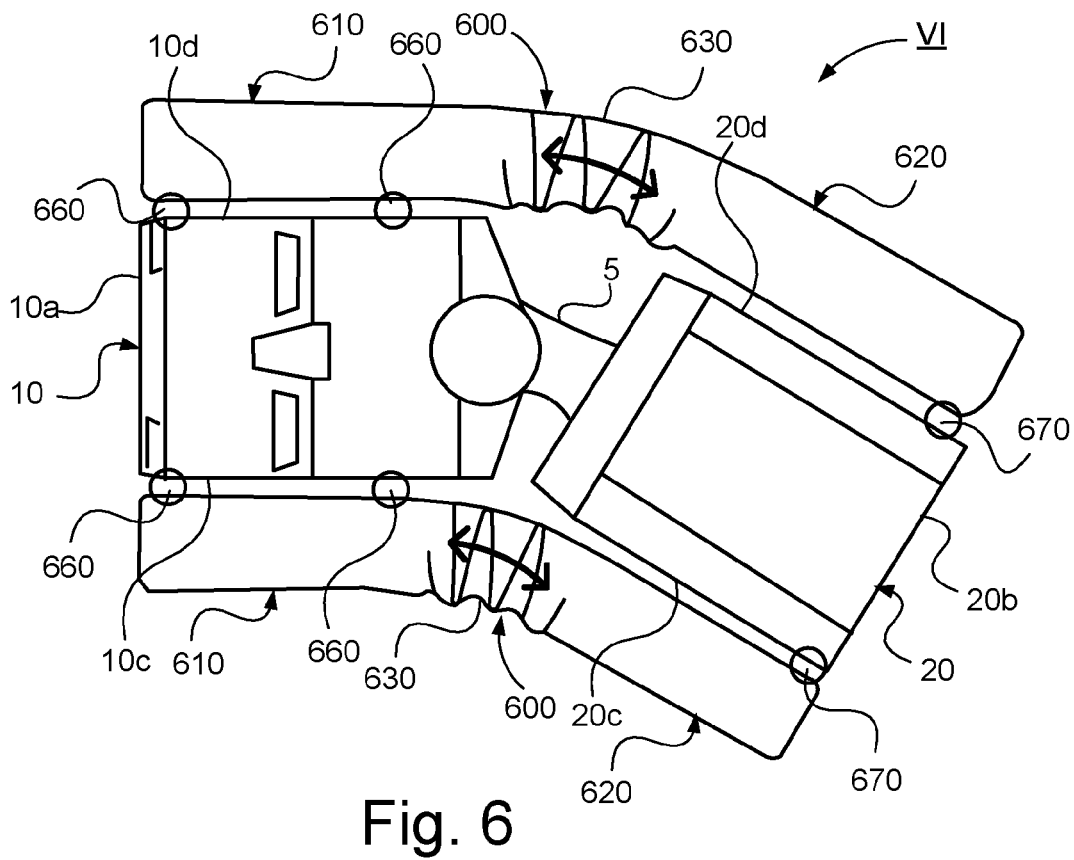
FIG. 6 schematically illustrates a plan view of an amphibious two-bodied vehicle according to an embodiment of the present invention.

FIG. 6 schematically illustrates a plan view of an amphibious two-bodied vehicle VI in the shape of an articulated vehicle VI with a floating device according to an embodiment of the present invention.

The floating device according to the embodiment illustrated in FIG. 6 differs from the floating device according to the embodiment in FIG. 5 essentially by the shape of said linked waist portion 630 and the connection to the vehicle VI.

Said linked waist portion 630 is constituted by a flexible portion of the floating element 600, said front and rear floating element portion 610, 620 being connected to said flexible portion 630 and according to a variant constitute an integrated part of said flexible portion 630. Said linked waist portion 630 is configured in the longitudinal extension of the floating element such that the length of the waist portion 630 may be varied. Said linked waist portion 630 is consequently extendable and compressible in longitudinal extension of the floating element 600.

Said waist portion 630 is preferably reversibly extendably configured. Said waist portion 630 is according to an embodiment backspringingly stretchably configured.

Said flexible portion 630 constitutes according to a variant a bellows configuration 630 about which said front and rear floating element portions 610, 620 are pivotable and where said bellows configuration 630 is reversibly extendably configured in the longitudinal extension of the floating element 600.

Said first and second floating element portions 610, 620 constitute according to a variant rigid floating element portion 610, 620. Said first and second floating element portions 610, 620 constitute according to a variant inflatable floating element portions.

The front floating element portion 610 of the respective floating element 600 is fixedly arranged to the front vehicle unit 10 and the rear floating element portion 620 is fixedly arranged to the rear vehicle unit 20. The front floating element portion 610 is fixedly arranged in connection to the long side 10c, 10d of the front vehicle unit 10 via fastening members 660. The rear floating element portion 620 is fixedly arranged in connection to the long side 20c, 20d of the rear vehicle unit via fastening members 670.

Hereby, during mutual pivoting of the front and rear vehicle units 10, 20, the floating element 600 arranged on the side of the vehicle 10d, 20d where the front and rear vehicle units 10, 20 form an angle greater than 180 degrees is allowed to be extended at the linked waist portion 630 and the floating element 600 arranged on the side of the vehicle 10c, 20c, where the front and rear vehicle units 10, 20 form an angle corresponding to less than 180 degrees is allowed to be compressed.

Figure 7:
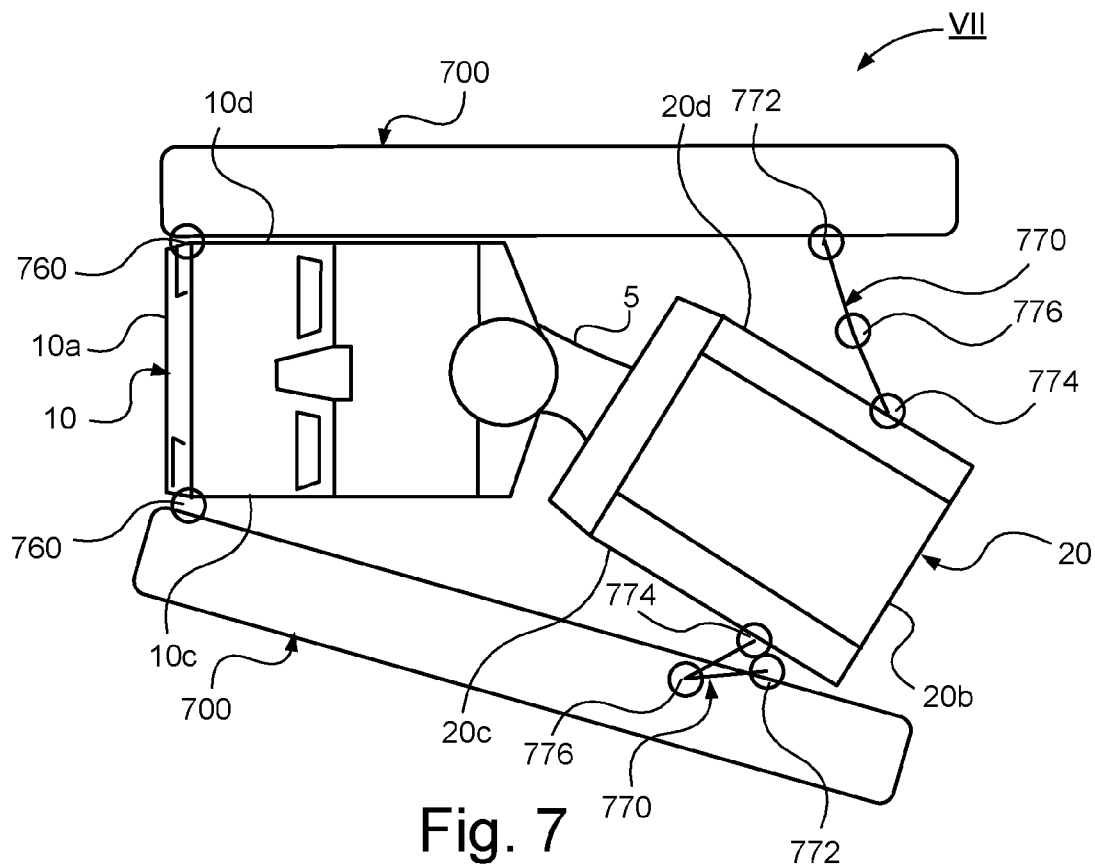
FIG. 7 schematically illustrates a plan view of an amphibious two-bodied vehicle according to an embodiment of the present invention.

FIG. 7 schematically illustrates a plan view of an amphibious two-bodied vehicle VII n the shape of an articulated vehicle VIII with a floating device according to an embodiment of the present invention.

The floating device according to the embodiment illustrated in FIG. 7 differs from the floating device according to the embodiment in FIGS. 5 and 6 essentially by the shape of said floating element 700 of the floating element arrangement 700, 760, 770.

Said floating element arrangement 700, 760, 770 comprises a rigid floating element 700 arranged on each side of the vehicle and linkedly arrange at the vehicle VII. Said rigid floating element 700 is arranged to run along essentially the entire length of the vehicle along the long side 10c, 10d, 20c, 20d of the vehicle. Said rigid floating element 700 is consequently constituted by a rigid body and hereby has no waist portion and is consequently not pivotable at the area between said front and rear vehicle units 10, 20.

The respective rigid floating element 700 is inwardly and outwardly pivotably linked to said rear vehicle unit 20.

The respective rigid floating element 700 is linkedly arranged at a front portion of the floating element 700 at the front vehicle unit 10 and linkedly arranged at a rear portion of the floating element 700 at the rear vehicle unit 20. The floating element 700 linkedly arranged at the front portion in connection to the long side of the front vehicle unit 10 via fastening members 760. The floating element is linkedly arranged at the rear portion in connection to the long side 20c, 20d of the rear vehicle unit 20 via a link configuration 770.

Said link configuration 770 comprises according to this embodiment a first link portion 772 arranged at a rear portion of the floating element 700, a second link portion 774 arranged at a rear area of the rear vehicle unit 20, and a third link portion 776 linkedly connected to the first and second link portions 772, 774.

Said link configuration 770 is according to an embodiment configured to spring back such that said link configuration 770 strives to bring said floating element 700 to the original position in which the floating element 700 is adjacent to the front and rear vehicle units 10, 20. Said link configuration 700 hereby comprises spring members arranged in connection to said third link portion 776 to bring said floating element 700 to its original position by applied spring force. Said spring member comprises according to a variant a torsion spring or a coil spring arranged about said third link portion.

Said spring member comprises according to a variant a screw spring or a rubber spring comprising according to a variant a spring function between the rear vehicle unit 20 and the floating element 700 arranged about said link portion.

Said link configuration 770 is arranged to essentially keep said floating element 700 at essentially the same level of elevation in connection to the rear vehicle unit 20. Said link configuration 770 is arranged to allow roll of the rear vehicle unit 20.

By means of the floating device according to the embodiment illustrated in FIG. 7 use of rigid floating elements such as a rigid pontoon along essentially the entire length of the vehicle is facilitated for good drive in the water and at the same time mutual pivoting of front and rear vehicle units 10, 120 both in water and on land is facilitated.

Figure 8:
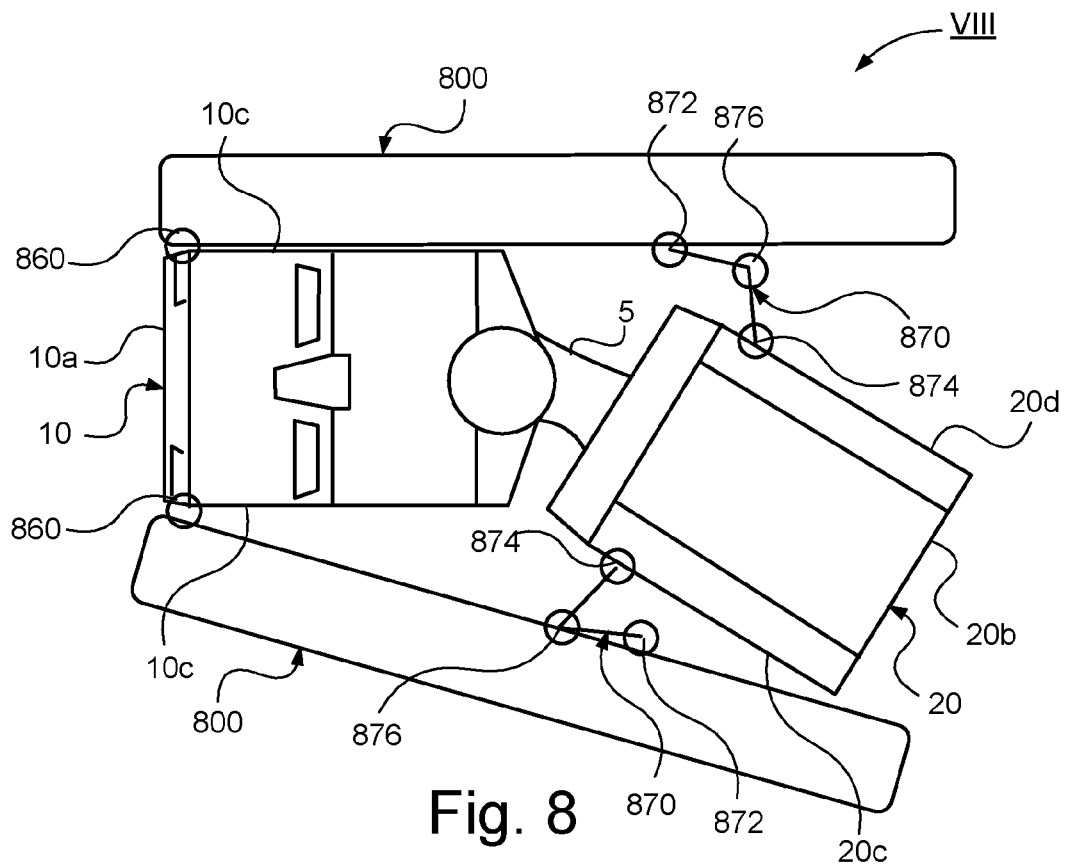
FIG. 8 schematically illustrates a plan view of an amphibious two-bodied vehicle according to an embodiment of the present invention.

FIG. 8 schematically illustrates a plan view of an amphibious two-bodied vehicle VIII in the shape of an articulated vehicle VIII with a floating device according to an embodiment of the present invention.

The floating device according to the embodiment illustrated in FIG. 8 differs from the floating device according to the embodiment in FIG. 7 essentially by the placement of said link configuration 870.

The respective rigid floating element 800 is linkedly arranged at the front vehicle unit 10 at a front portion of the floating element 800 via fastening members 860.

Said link configuration 870 comprises according to this embodiment a first link portion arranged at a portion of the floating element 800, a second link portion arranged at a front area of the rear vehicle unit 20, and a third link portion 876 linkedly connected to the first and second link portion 872, 874.

Figure 9:
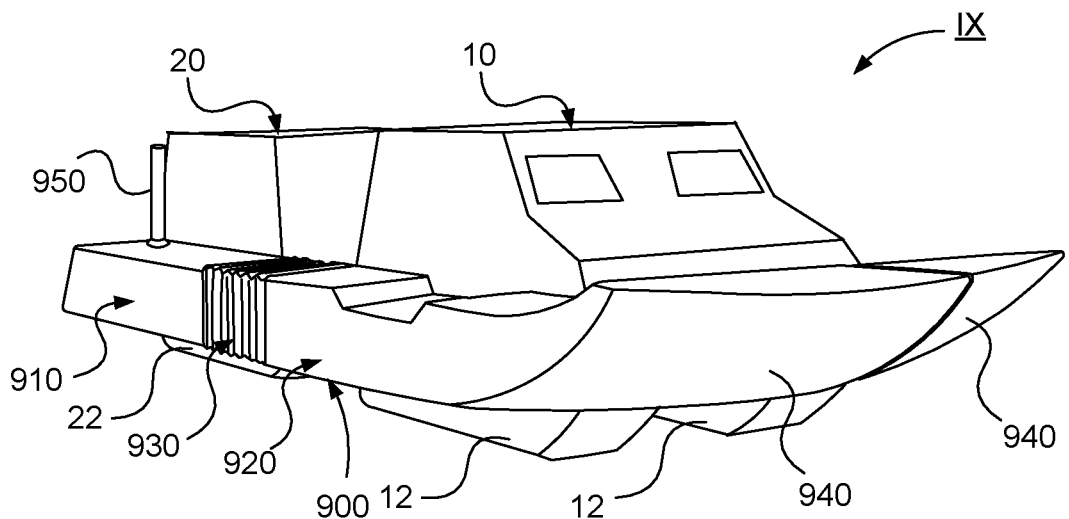
FIG. 9 schematically illustrates a perspective view of an amphibious two-bodied vehicle according to an embodiment of the present invention.

FIG. 9 schematically illustrates a perspective view of an amphibious two-bodied vehicle IX in the shape of an articulated vehicle IX with a floating device 900, 950 according to an embodiment of the present invention.

The floating device 900, 950 according to the embodiment illustrated in FIG. 9 differs from the floating device according to the embodiment in FIG. 3 essentially by the shape of said floating element 900 of the floating element arrangement 900.

The respective floating element 900 has portion 940 arranged as a stem of a boat in the front floating element portion 910. The respective portion 940 arranged as a boat stem is configured to run around the front side 10a of the front vehicle unit 10 such that the boat stem portion 940 of the left floating element portion 910 and the boat stem portion 940 of the right floating element portion 910 essentially abuts against each other and thus essentially forms a stem of a boat body which results in good drive in water.

The respective floating element 900 has drive means 950 arranged in the rear floating element portion 920 and being constituted by a water jet motor for propulsion of the vehicle IX.

Figure 10:
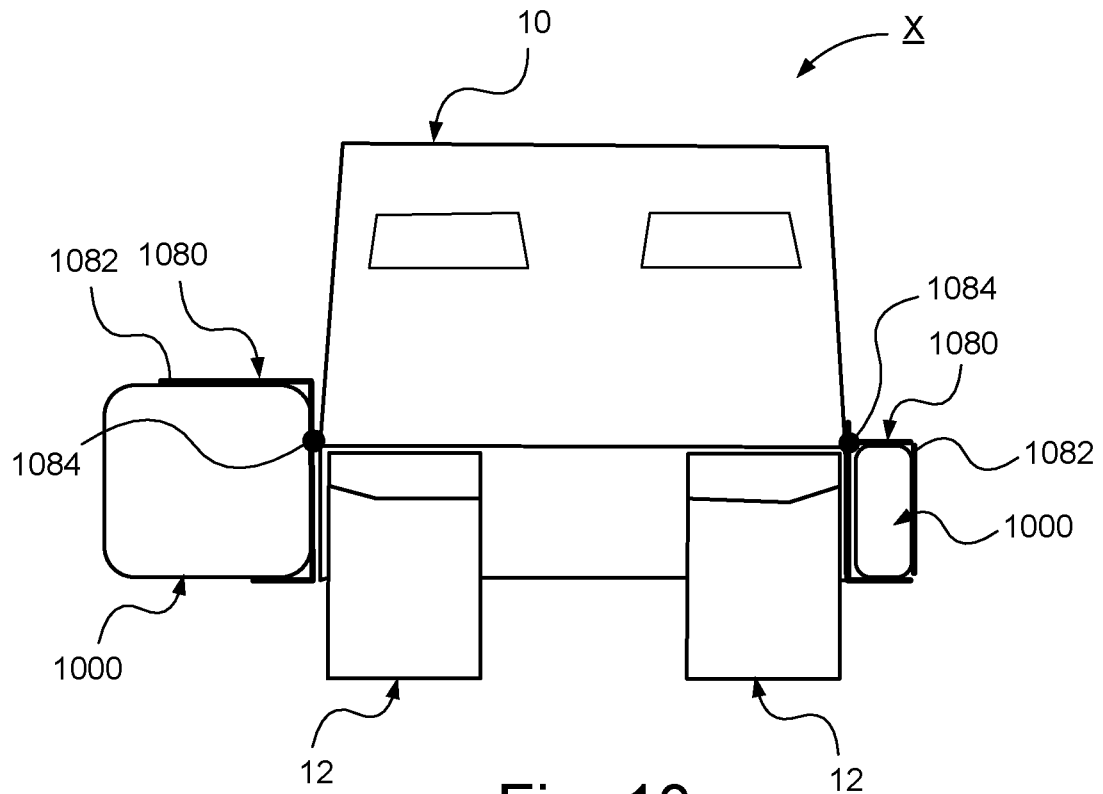
FIG. 10 schematically illustrates a front view of an amphibious two-bodied vehicle according to an embodiment of the present invention.

FIG. 10 schematically illustrates a front view of an amphibious two-bodied vehicle X in the shape of an articulated vehicle X with a floating device according to an embodiment of the present invention.

Said floating element 1000 of the floating device 100, 1080 is according to this variant constituted by an inflatable floating element. Said floating device comprises a carrier device 1080 arranged on the respective side of the vehicle to support a respective floating element 100. Said carrier device 1080 comprises a roof configuration 1082 linkedly attached to the vehicle X via a link 1084.

Said carrier device 1080 is arranged to be raised during inflated state of said inflatable floating element in order to accommodate the inflated floating element 100 and folded during evacuated and consequently volume reduced floating element 1000 such that it surrounds the evacuated floating element 1000. In FIG. 10 the right floating element 1000 is shown in the inflated state and the left floating element 100 in the evacuated and in the carrier device 1080 stowed away state.

Said inflatable floating elements 1000 are configured such that they extend along essentially the entire length of the vehicle along the long sides 10c, 10d, 20c, 20d in the inflated state. Said floating elements 1000 comprise a front and rear floating element portion pivotable about a linked waist portion, said waist portion according to a variant being formed in the inflated state by the front and rear floating element portions bearing against each other forming said floating elements 100 and according to an alternative variant by a link configuration there between or a tapering there between.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated.

The invention claimed is:

1. A floating device for an amphibious two-bodied vehicle with a front vehicle unit and a rear vehicle unit, which are mutually pivotable, the floating device comprising:
    a floating element configuration extending along essentially the entire length of a longitudinal side of the vehicle and being arranged to provide additional displacement,
    wherein said floating element configuration is arranged for accommodating mutual pivoting of said vehicle units during floating as well as non-floating drive.

2. A floating device according to claim 1, wherein said floating element configuration comprises a floating element arrangement in connection to the respective longitudinal side of the vehicle.

3. A floating device according to claim 2, further comprising floating element arrangements comprising a front and a rear floating element portion mutually pivotably connected to each other in connection to a linked waist portion between the vehicle units.

4. A floating device according to claim 3, wherein a bellows configuration is provided between said front and rear floating element portions.

5. A floating device according to claim 3, wherein a link configuration is provided between said front and rear floating element portions.

6. A floating device according to claim 3, wherein said front and rear floating element portions are inflatable and mutually pivotable.

7. A floating device according to claim 3, wherein one of said front and rear floating elements is fixedly arranged to the vehicle and the other of said front and rear floating elements is displacably arranged to the vehicle in its longitudinal direction.

8. A floating device according to claim 2, wherein said floating element arrangement comprises a rigid floating element linkedly arranged to the vehicle.

9. A floating device according to claim 8, wherein said rigid floating element is inwardly and outwardly pivotably linked to said rear vehicle unit.

10. A floating device according to claim 1, wherein said floating element configuration comprises a member for propulsion.

11. A floating device according to claim 10, wherein said floating element configuration comprises propellant for said propulsion.

12. A floating device according to claim 10, wherein said floating element configuration comprises a portion arranged as a bow.

13. An amphibious vehicle comprising a floating device according to claim 1.

14. An amphibious vehicle according to claim 13, wherein said vehicle is constituted by an articulated tracked vehicle.

* * * * *